United States Patent Office 3,251,374
Patented May 17, 1966

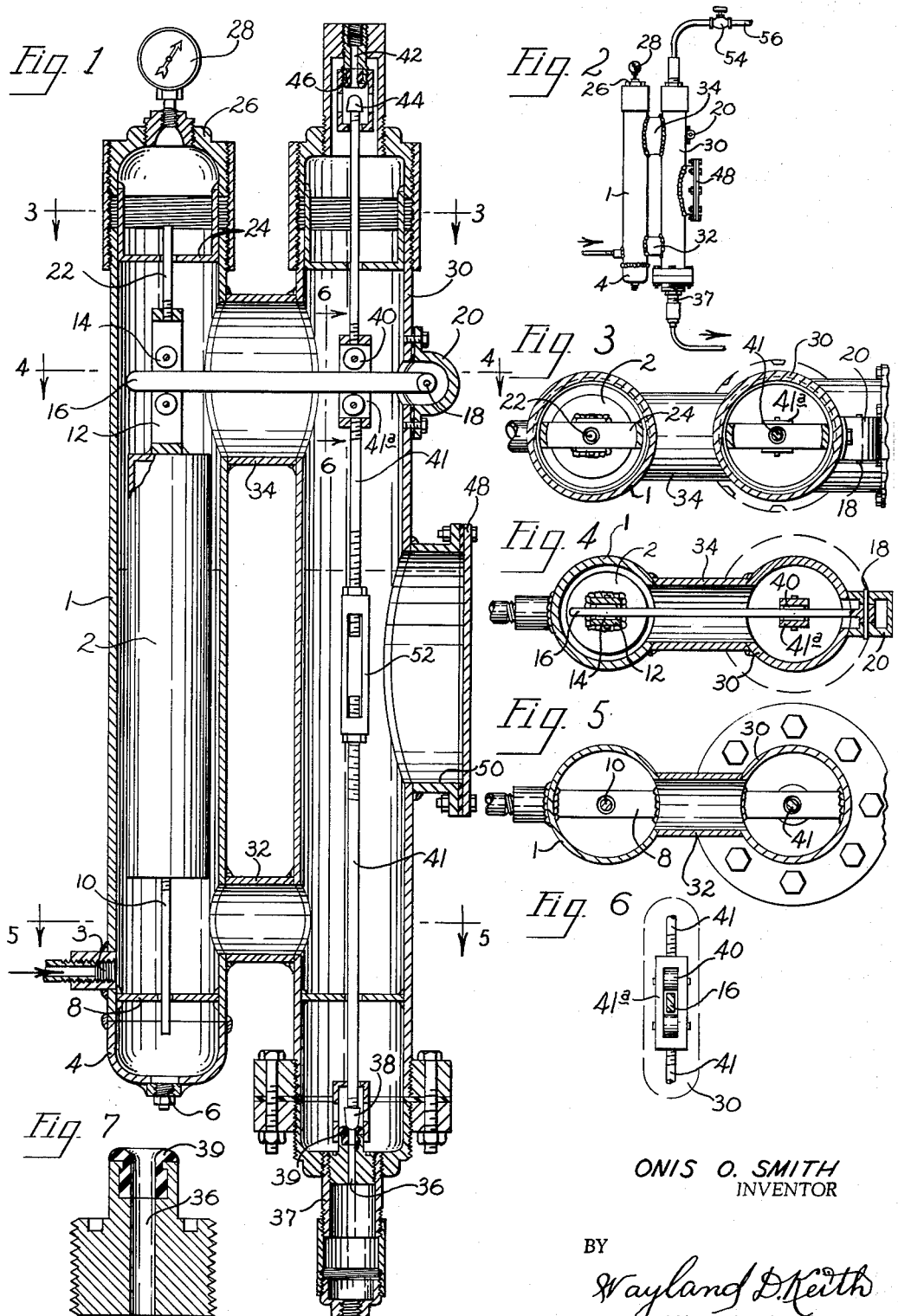

3,251,374
DEVICE FOR CONTINUOUSLY REMOVING AIR FROM A FLUID PASSING THROUGH A CLOSED CONDUIT SYSTEM
Onis O. Smith, Wichita Falls, Tex., assignor to Smith Oil Agitator Company
Filed Oct. 29, 1963, Ser. No. 319,707
4 Claims. (Cl. 137—174)

This invention relates to improvements in air release valves and more particularly to a float actuated air release valve for removing air or other gases from a liquid, as the liquid passes therethrough, so as to enable the delivering of liquid which is free of air or gas to a point of use. As an example, to deliver salt water or the like to water flood a well, which salt water is to be injected into a water input well in such manner as to eliminate the air content of the water being injected into the input well, thereby greatly increasing the efficiency of the operation and thereby eliminating the hazards of injecting air into a pipe line, well tubing and casing and into oil producing formation.

The present device is so constructed that it may be readily assembled and disassembled, and the various parts thereof are readily accessible for repair and replacement.

The present device may be so constructed as to enable the device to operate under high pressure or with suction with a minimum of friction.

An object of this invention is to provide an air release valve for release of air or gas from a liquid, such as salt water, as the liquid is pumped through the device preparatory to the injection thereof into a water input well, or to such other use as the liquid may be put, wherein a liquid is required which is free of air or gas.

Another object of the invention is to provide a float actuated air release valve which will maintain the liquid at a predetermined height in the float valve housing, and will close off the air release port of the air release valve, when the liquid being passed therethrough is in excess of the outlet capacity of the valve, or which liquid does not contain air.

Still another object of the invention is to provide an air release valve in which the actuating elements and valves are mounted between anti-friction rollers so as to minimize the friction produced by the opening and closing of the valve.

Still another object of the invention is to provide an air release valve and a liquid release valve, which valves have opposed discharge ports, each of which valves may be adjusted independently with respect to the other.

Yet another object of the invention is to provide an air release valve which is rigid in construction, low in the cost of manufacture, and effective in operation.

A final object of the invention is to provide an air release valve for a closed salt water conduit system to remove air from the mixture of salt and water as it passes through the system, thereby decreasing the corrosive action of the piping by oxidation.

With these objects in mind and others which will become manifest as the description proceeds, reference is to be had to the accompanying drawings, in which like reference characters designate like parts in the several views thereof in which:

FIG. 1 is a longitudinal, sectional view through the device, with parts shown in elevation to bring out the details of construction;

FIG. 2 is an elevational view of the device on a reduced scale, showing the device installed within a liquid supply system;

FIG. 3 is a sectional view taken on the line 3—3 of FIG. 1, looking in the direction indicated by the arrows;

FIG. 4 is a sectional view taken on the line 4—4 of FIG. 1, looking in the direction indicated by the arrows;

FIG. 5 is a sectional view taken on the line 5—5 of FIG. 1, looking in the direction indicated by the arrows;

FIG. 6 is a sectional view taken on the line 6—6 of FIG. 1, looking in the direction indicated by the arrows; and FIG. 7 is an enlarged, fragmentary view, which shows a valve seat.

With more detailed reference to the drawing, the numeral 1 designates generally a float housing having a float 2 mounted therein for movement in response to liquid which flows through the housing or which liquid is retained therein. The housing 1 is closed by a bull plug 4, which plug preferably has a drain outlet 6 in the lower end thereof. A transverse bar 8, which is vertically apertured mediate the ends thereof, is positioned immediately above the bull plug, to receive a guide pin 10 therein in sliding relation, which pin is positioned on the lower end of float 2. The float 2 is preferably of metal and has a yoke shaped member 12 secured centrally thereto at the upper end thereof, as by welding or the like. Anti-friction rollers 14 are mounted in housing 1 in journal relation on opposite sides of a lever 16, which lever 16 is pivoted, by means of a pivot pin 18, within a recessed housing 20, which recessed housing 20 is mounted on a side of valve mechanism housing 30 which houses the valve mechanism, so as to be responsive to the upward and downward movement of float 2. The float housing 1 has an inlet opening 3 therein for the passage of water or liquid thereinto, as indicated by arrows in FIG. 1.

A pin 22 is mounted centrally of yoke 12 and extends medially upward through an apertured strap 24, which is secured to a cap 26, which cap is threadably mounted on the upper end of housing 1. The cap 26 may be apertured to receive a pressure gauge 28 therein, which gauge is used to determine the pressure within float housing 1.

The pins 10 and 22 are adapted to pass through axial apertures so as to guide the float 2 centrally of the housing 1. The valve mechanism housing 30 is interconnected, by conduits 32 and 34, with housing 1, so that housings 1 and 30 will be in fluid communication.

The conduit 32 permits fluid to pass directly from the inlet 3 into the lower portion of housing 30, and the water therein to pass out through water outlet opening 36, if the valve 38, which is in valve mechanism housing 30 is in open position; however, when the valve 38 is in a closed position, water cannot escape until water or other liquid has risen a sufficient height within the housing 1 and in the housing 30 to cause the float 2 to rise, which in turn will cause the lever 16 to engage the upper roller of rollers 40, which will lift valve 38 off valve seat 39. The rollers 40 are mounted in a yoke-shaped member 41a intermediate the length of valve connector rods 41 so as to enable the rollers 40 to be positioned above and below lever 16 to reduce the friction in the operation of the valves by the float 2. So long as the body of liquid, in housings 1 and 30, is maintained at a sufficient height, the valve 38 will remain open, and any air passing therethrough will pass out through air outlet 42, if valve 44 in the upper end of valve mechanism housing 30 is open. However, if the water level continues to rise, the valve 44 will seat on seat 46 in the upper end of valve mechanism housing 30 and close outlet opening 42, and water pressure will build up to force the water out through outlet opening 36 into conduit 37 and to a point of use. However, if air accumulates within the housings 1 and 30, the liquid level will drop, which will cause the float 2 to drop, so that the rollers 14 will contact the upper face of lever 16 to urge the lever 16 downward against the lowermost of rollers 40, which in turn will urge valve connector rods 41 downward to cause valve 44 to move off valve seat 46, which will bleed the excess air out of chambers 1 and 30 to permit the cycle to continue.

A hand hole cover plate 48 closes a hand hole opening 50 in a side of housing 30 in such manner that the hand hole cover plate 48 may be removed to adjust turnbuckle 52 on rods 41 to enable the proper setting of valves 38 and 44.

The air outlet opening 42 normally remains open unless valve 42 is seated, however, a valve 54 is provided within air outlet pipe 56 to enable the valve to be closed for the purpose of testing equipment. During normal operation the valve 54 is left open.

Having thus clearly shown and described the invention, what is claimed as new and desired to be secured by Letters Patent is:

1. A device for continuously removing air from a fluid mixture of air and liquid, as the fluid mixture passes through a conduit, which device comprises;
   (a) an upright, elongated float housing,
      (1) said upright, elongated float housing having a fluid mixture inlet formed therein,
   (b) an upright, elongated valve mechanism housing
      (1) said upright, elongated valve mechanism housing having a liquid outlet opening formed in the bottom thereof,
      (2) said upright, elongated valve mechanism housing having an air outlet formed in the upper end thereof,
   (c) spaced apart, horizontal conduits interconnecting said upright, elongated float housing and said upright, elongated valve mechanism housing,
   (d) an elongated float mounted in said upright, elongated float housing for movement axially therein,
   (e) a pair of valves operatively mounted in said upright, elongated valve mechanism housing and being in axially aligned, guided relation with the liquid outlet opening and with the air outlet opening, respectively,
   (f) a lever pivoted in one of said housings and extending through one of said horizontal conduits into the other of said housings, and being operatively associated with said float and being operatively associated with said pair of valves, so movement of said lever in one direction will move one of said valves to close said liquid outlet opening and will move the other of said valves to open said air outlet opening, and movment of said lever in the opposite direction will move one of said valves to open said liquid outlet opening and will move the other of said valves to close said air outlet opening.

2. A device for continuously removing air from a fluid mixture of air and liquid, as the fluid mixture passes through a conduit, which device comprises;
   (a) an upright, elongated float housing,
      (1) said upright, elongated float housing having a fluid mixture inlet formed therein,
   (b) an upright, elongated valve mechanism housing,
      (1) said upright, elongated valve mechanism housing having a liquid outlet opening formed in the bottom thereof,
      (2) said upright, elongated valve mechanism housing having an air outlet opening formed in the upper end thereof,
   (c) spaced apart, horizontal conduits interconnecting said upright, elongated float housing and said upright, elongated valve mechanism housing,
   (d) an elongated float mounted in said upright, elongated float housing for movement axially therein,
   (e) interconnecting, axially aligned rods positioned axially of said elongated valve mechanism housing and being in axially aligned relation with said liquid inlet opening and said air outlet opening in said elongated valve mechanism housing,
      (1) a valve mounted on the distal end of each said rod, said valves being in opposed relation,
   (f) an elongated, yoke-shaped member mounted intermediate said valves within the length of said rods,
   (g) a pair of spaced apart rollers journaled within said yoke-shaped member,
   (h) a lever pivoted in said elongated valve mechanism housing and extending through said yoke-shaped member and between said rollers, and extending through one of said conduits into said elongated float housing,
      (1) said lever being operatively associated with said float so upon movement of said lever in one direction, said lever will contact one of said rollers in said yoke-shaped member and move one of said valves to close said liquid outlet opening, and will move the other of said valves to open said air outlet opening and the other of said valves will be moved to open said air outlet opening,
      (2) movement of said lever in the opposite direction will contact the other of said rollers in said yoke-shaped member to move one of said valves to close said air outlet opening, and the other of said valves will be moved, simultaneously, to open said liquid outlet opening.

3. A device for continuously removing air from a fluid mixture of air and liquid, as the fluid mixture passes through a conduit, as defined in claim 2; wherein
   (a) said lever, operatively associated with said float, includes
      (1) an elongated yoke mounted on said float and having said lever extending therethrough,
   (b) a pair of spaced apart, anti-friction rollers journaled in said elongated yoke, one on each side of said lever, so upon movement of said float in one direction, one of said rollers will contact said lever in rolling relation and upon movement of said float in the opposite direction, said lever will contact the opposite roller in rolling relation, and
   (c) guide means guiding said float axially within said float housing.

4. A device for continuously removing air from a fluid mixture of air and liquid, as the fluid mixture flows through a pair of housings within a conduit system, which device comprises;
   (a) an upright, elongated float housing,
      (1) said upright, elongated float housing having a fluid mixture inlet formed therein,
   (b) an upright, elongated valve mechanism housing,
      (1) said upright, elongated valve mechanism housing having a liquid outlet opening formed in the bottom thereof,
      (2) said upright, elongated valve mechanism housing having an air outlet opening formed in the upper end thereof,
   (c) spaced apart, horizontal conduits interconnecting said upright, elongated float housing and said upright, elongated valve mechanism housing,
   (d) a float mounted in said upright, elongated float housing for movement therein,
   (e) a pair of valves operatively mounted in said upright, elongated valve mechanism housing and being in aligned, guided relation with the liquid outlet opening and with the air outlet opening, respectively,
   (f) a lever pivoted in one of said housings and extending through one of said horizontal conduits into the other of said housings, and being operatively associated with said float and being operatively associated with said pair of valves so, upon movement of said lever in one direction, one of said valves will be moved to close said liquid outlet opening and the other of said valves will be moved to open said air outlet opening, and movement of said lever in the opposite direction will move one of said valves to open said liquid outlet opening, and the other of said valves will be moved to close said air outlet opening.

(References on following page)

References Cited by the Examiner

UNITED STATES PATENTS

| | | | |
|---|---|---|---|
| 354,078 | 12/1886 | Wyman | 137—411 X |
| 428,399 | 5/1890 | Moore | 137—174 |
| 1,619,431 | 3/1927 | Mendizabal | 137—426 X |
| 1,897,398 | 2/1933 | Raymond | 137—174 |
| 2,198,291 | 4/1940 | Poe | 137—202 |
| 2,224,345 | 12/1940 | Heathman | 137—202 X |
| 2,346,890 | 4/1944 | Abbott | 137—426 X |
| 2,540,361 | 2/1951 | Whitley | 137—426 X |
| 2,638,111 | 5/1953 | Wagner | 137—174 X |
| 2,742,049 | 4/1956 | Granberg | 137—426 X |

MARTIN P. SCHWADRON, *Primary Examiner.*

ISADOR WEIL, *Examiner.*

A. COHAN, *Assistant Examiner.*